US007036804B2

(12) United States Patent
Bodie et al.

(10) Patent No.: US 7,036,804 B2
(45) Date of Patent: May 2, 2006

(54) BI-STATE HYDRAULIC MOUNT WITH INTEGRAL CONTROLLER

(75) Inventors: Mark O. Bodie, Dayton, OH (US); Mark W. Long, Bellbrook, OH (US); Sanjiv Tewani, Lebanon, OH (US); Ronald Beer, Fairborn, OH (US); Bruce A. Heaston, West Milton, OH (US); Brandon Fedders, West Carrollton, OH (US)

(73) Assignee: Delphi Technologies, Inc., Troy, MI (US)

( * ) Notice: Subject to any disclaimer, the term of this patent is extended or adjusted under 35 U.S.C. 154(b) by 11 days.

(21) Appl. No.: 10/637,054

(22) Filed: Aug. 7, 2003

(65) Prior Publication Data

US 2005/0029720 A1     Feb. 10, 2005

(51) Int. Cl.
*F16F 13/00* (2006.01)
*F16F 15/00* (2006.01)
*F16F 5/00* (2006.01)
*F16F 9/00* (2006.01)
*F16M 11/00* (2006.01)

(52) U.S. Cl. ............................. 267/140.14; 267/141.6; 267/141.4

(58) Field of Classification Search ................ 267/292, 267/140.11, 140.13, 140.14, 140.15, 141.4, 267/141.6; 188/266.2, 266.5, 267
See application file for complete search history.

(56) References Cited

U.S. PATENT DOCUMENTS

| 5,398,917 | A | 3/1995 | Carlson et al. ......... 267/140.14 |
|---|---|---|---|
| 5,439,204 | A * | 8/1995 | Yamazoe et al. ....... 267/140.14 |
| 5,703,748 | A * | 12/1997 | Fulks et al. ................. 361/153 |
| 5,961,104 | A * | 10/1999 | Gennesseaux ......... 267/140.14 |
| 6,247,683 | B1 * | 6/2001 | Hayakawa et al. ...... 267/64.11 |
| 6,361,031 | B1 * | 3/2002 | Shores et al. .......... 267/140.14 |
| 6,371,462 | B1 * | 4/2002 | Gennesseaux ......... 267/140.13 |
| 6,485,005 | B1 | 11/2002 | Tewani et al. .......... 267/140.13 |
| 6,497,309 | B1 | 12/2002 | Lisenker et al. ......... 188/267.2 |
| 6,547,226 | B1 | 4/2003 | Shores et al. |
| 6,880,483 | B1 * | 4/2005 | Fedders ....................... 114/363 |
| 2002/0109280 | A1 * | 8/2002 | Baudendistel et al. . 267/140.15 |
| 2004/0150145 | A1 * | 8/2004 | Tewani et al. .......... 267/140.14 |
| 2004/0188905 | A1 * | 9/2004 | Goto et al. ............ 267/140.15 |

* cited by examiner

*Primary Examiner*—Devon C. Kramer
(74) *Attorney, Agent, or Firm*—Michael D. Smith

(57) ABSTRACT

A hydraulic mount having first and second fluid tracks, and a decoupler functioning as an air spring with two remotely selectable settings. The settings allow tailoring of the air spring characteristics to provide mount damping for differing engine operating states, such as engine idle. A solenoid is used to select a smaller or larger air volume to control the characteristics of the air spring and, in turn, the dynamic response of the hydraulic mount. An integral controller provides switched operation of the solenoid and compensates for variations in temperature and input voltage, as well as minimizing electrical noise generated by the solenoid when it is energized.

12 Claims, 1 Drawing Sheet

BI-STATE HYDRAULIC MOUNT WITH INTEGRAL CONTROLLER

TECHNICAL FIELD

The present invention pertains generally to a hydraulic mount for vibration damping and, more particularly, a hydraulic mount assembly including a decoupler that functions as an air spring to provide remotely selectable damping characteristics to match the characteristics of the input vibration.

BACKGROUND OF THE INVENTION

Hydraulic mounts are used in many situations where it is desired to isolate sources of vibration, or to protect sensitive equipment from shock and vibration. Examples include, but are not limited to: industrial equipment and machinery isolators; industrial robotics; building, bridge and ship isolators; military weapons systems; agricultural equipment; and construction equipment. Hydraulic mounts are also often used with vehicle powertrains to control movement of the powertrain in response to forces, such as reaction torque and vibration. The mounts serve a second function, that of isolating the engine from the body of the vehicle. A well-known type of hydraulic vibration damping mount generates damping in a predetermined frequency range of vibrations by pumping a hydraulic fluid through an orifice track of predetermined dimensions. The dimensions of the orifice track are typically such that the hydraulic fluid resonates at certain frequencies of input vibration, which maximizes the damping of the mount. At vibration frequencies above the track resonance the dynamic rate of the mount increases, reducing the isolative properties of the mount. Hydraulic mounts may also be provided with devices known as decouplers, which are disposed in a space formed within the mount orifice plate, for example, and allowed limited free travel within the space to "short circuit" the fluid from flowing through the orifice track, thus generating a low magnitude of dynamic stiffness necessary to provide isolation of certain vibrations. When the input vibration to the mount exceeds the allowable limit of the free motion of the decoupler, the hydraulic fluid flows through the orifice track, thereby generating the mount damping characteristics.

For optimum isolation, the dynamic rate of the mount at the input vibration or "disturbance" frequency should be as low as possible. Since the resonant frequency of the hydraulic damping mount is fixed by the dimensions of the orifice track, prior art mounts must be designed to cover as broad a range of vibration characteristics as possible, or to damp the most prevalent vibration frequencies, to provide effective damping. This necessarily results in a tradeoff or compromise in the performance of the mount. For example, a vehicle's powertrain exhibits varying vibration characteristics as the engine changes from an idle state, where the engine is operating at a low rate (typically measured in revolutions per minute or "RPM"), to an operating state, where the engine operates at a higher RPM. These changing input vibration frequencies are imposed upon the mount. However, due to the fixed physical properties of the mount, the mount's effectiveness at damping the vibration will be greater or lesser, depending upon the mismatch between the disturbance frequency and the resonant frequency of the mount. Accordingly, there is a need for a hydraulic damping mount that provides improved performance over a broader range of disturbance frequencies.

SUMMARY OF THE INVENTION

The present invention is a bi-state hydraulic mount that provides improved damping performance over a broader range of input vibration frequencies by means of a first hydraulic fluid track, a second hydraulic fluid track and a decoupler functioning as an air spring having two remotely selectable settings. The characteristics of the air spring can thus be tailored to provide mount damping compatible with a particular engine operating state. For example, a first setting of the air spring may reduce the dynamic rate of the mount during engine idle conditions for improved isolation. The second air spring setting may be tuned to provide mount damping tailored to the disturbances generated by the engine when it is operating at RPMs above idle.

The air spring is formed by an elastomeric decoupler that is held captive in an orifice plate assembly and encloses a selectable volume of air. The characteristics of the air spring are controlled by the volume of air. An integral solenoid is used to select either a first air cavity alone, or the first cavity in combination with a second air cavity. When the solenoid is not energized, a spring-actuated plunger seals an orifice between the first and second air cavities, limiting the volume of air enclosed by the decoupler to the first cavity and increasing the compliance of the decoupler. The relatively high stiffness of the decoupler does not allow hydraulic fluid to easily pass into the first fluid track, forcing the fluid to flow into the second fluid track to control vibration from the engine, such as when the engine is operating above idle. When the engine is at idle, the solenoid may be actuated, moving the plunger away from the orifice and allowing communication between the first and second air cavities. The resulting increased volume of air enclosed by the decoupler reduces the compliance of the decoupler, allowing resonance in the first fluid track such that the dynamic rate of the mount is reduced for improved isolation during engine idle conditions.

An integral controller is used to energize the solenoid. The controller allows low-level logic control of the solenoid, reducing the electrical load placed on powertrain control components. The controller also compensates for variations in temperature and operating voltage. In addition, the controller limits the actuation rate of the solenoid so as to reduce noise during actuation.

SUMMARY OF THE DRAWING

Further features of the present invention will become apparent to those skilled in the art to which the present embodiments relate from reading the following specification and claims, with reference to the accompanying drawing, in which

DESCRIPTION OF THE PREFERRED EMBODIMENTS

Figure 1:
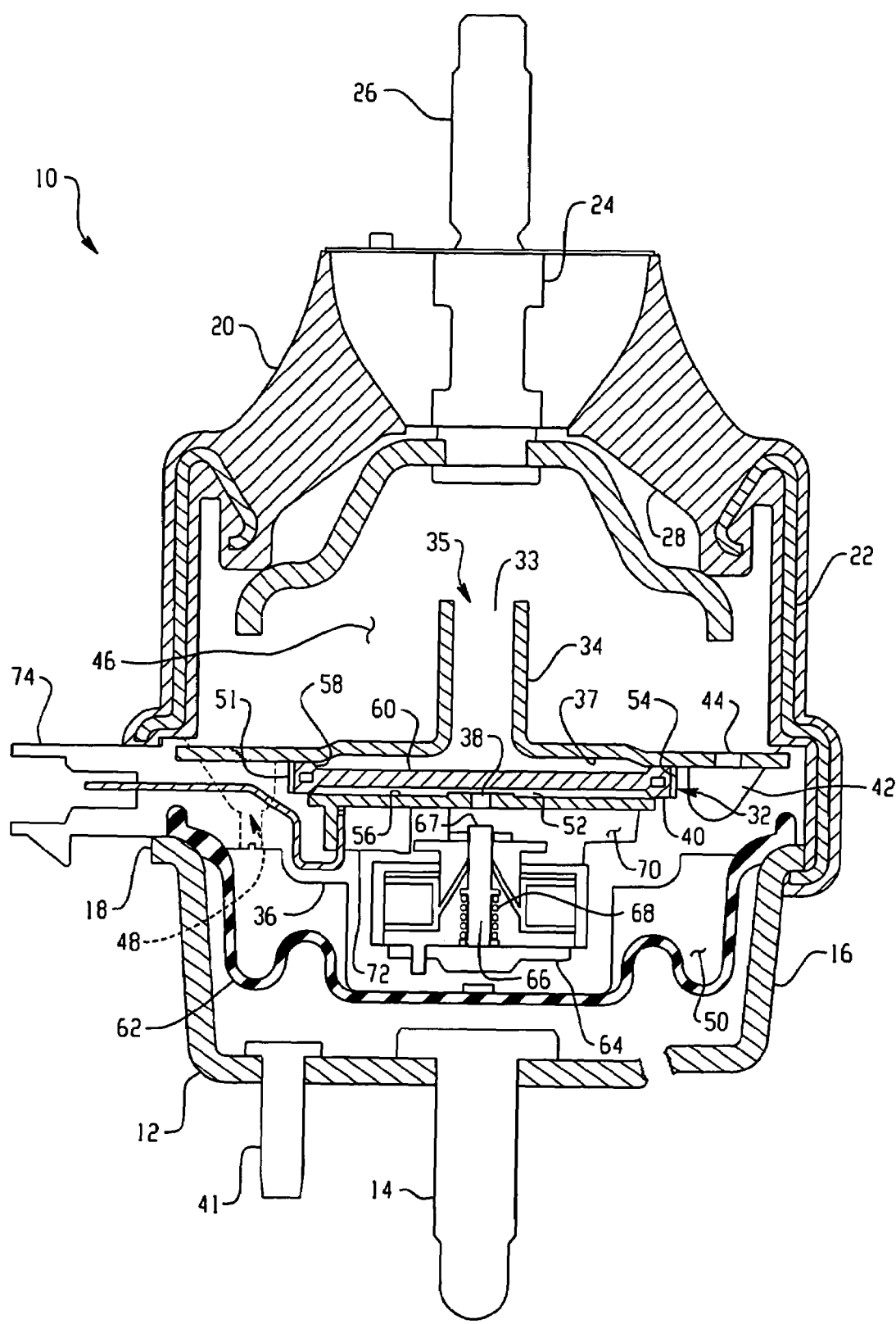
FIG. 1 is a longitudinal central section view of a hydraulic mount in accordance with an embodiment of the present invention.

In the description which follows, like parts are marked throughout the specification and drawing with the same reference numerals. The drawing figure is not necessarily to scale in the interest of clarity and conciseness.

FIG. 1 shows a hydraulic mount, generally designated 10, embodying the invention. The mount 10 includes a generally cylindrical, cup-shaped base 12 suitably secured to a mounting member or bracket assembly 14 by any conventional means, such as by molding, adhesives, press fit, welding and fasteners. The base 12 may be made from any suitable material, such as formed metal, and includes a peripheral side wall 16 and a circumferential, radially outwardly projecting flange 18. The base 12 may also include a key 41 to orient the mount 10 to an external bracket or brace (not shown) during installation and prevent the mount from rotating after being installed. The mount 10 is further characterized by a generally cylindrical molded elastomer body 20, which is reinforced by a suitable core part 22 made from any suitable material, such as metal, plastic or composites. The body 20 is molded to a central metal hub member 24, which supports a mounting member 26 for connecting the mount 10 to an engine assembly or the like.

The elastomer body 20 includes a central, generally cylindrical depending portion 28 that, in the position shown, is engageable with an orifice plate assembly 32 comprising an upper, generally cylindrical orifice plate 34 and a lower, generally cylindrical orifice plate 36. The upper orifice plate 34 further comprises an annular opening 35, which defines a first fluid track 33. The lower orifice plate 36 further comprises an orifice 38. Upper and lower orifice plates 34,36 are shown in assembly to define an annular passage or second fluid track 42 which opens through a first port 44 to a pumping chamber 46. A circumferentially spaced second port 48 communicates hydraulic fluid between second fluid track 42 and a second fluid chamber or reservoir 50 defined by a generally cup-shaped flexible diaphragm 62.

Lower orifice plate 36 also defines a generally cylindrical recess 51 that receives an elastomeric, cylindrical, disk-shaped decoupler member 40. A first air cavity 52 is defined by a peripheral outer wall 54 and a reduced-diameter, generally planar bottom wall surface 56, which is relieved to provide a space between bottom wall surface 56 and the decoupler 40, as shown. The decoupler 40 is also characterized by a circumferential rim part 58 that is trapped in fluid-tight sealing engagement between the upper orifice plate 34 and the lower orifice plate 36. However, a major part of the body 60 of the decoupler 40 radially inward of the rim 58 may be annularly recessed and allowed limited space within the recess 51 between the bottom surface 56 and the decoupler 40. Upper orifice plate 34 is also provided with a relieved cylindrical wall surface 37 to provide space between decoupler 40 and orifice plate 34 except at the rim 58.

A second air cavity 70, defined by lower orifice plate 36 and bottom wall surface 56, is in communication with first air cavity 52 via orifice 38. In this regard, the first and second air cavities may be filled with air or a suitable inert gas. A solenoid 64 having a plunger 66 and a spring 68 is mounted to the lower orifice plate 36 such that an actuating tip or end 67 of the plunger is aligned with orifice 38. The action of the solenoid 64 is such that the tip 67 of plunger 66 is held away from orifice 38 when the solenoid is energized, allowing communication between first air cavity 52 and second air cavity 70. When the solenoid is unenergized, tip 67 is held against orifice 38 by spring 68, effectively blocking communication between first air cavity 52 and second air cavity 70. An integral controller 72, mounted to lower orifice plate 36 within mount 10, is electrically connected to solenoid 64. The integral controller 72 provides switched electrical power to energize solenoid 64 upon command, and also provides compensation for variations in temperature and source voltage. Further, the controller 72 controls the energization rate of the solenoid 64 to reduce the generation of electrical noise by the solenoid. In addition, controller 72 accepts low-power logical control signals, reducing the electrical load placed on powertrain control components. An electrical connector 74 is mounted to the lower orifice plate 36 and sealed from internal exposure to the hydraulic fluid within the mount 10. The electrical connector 74 provides an external interface for electrical power and logical control to the integral controller 72.

In a first embodiment of the present invention, the second fluid track 42 is tuned to provide the desired dynamic rate to provide engine control during operation above idle. Movement of the elastomer body 20 causes fluid movement between the pumping chamber 46 and the reservoir 50, which are in communication via first and second ports 44,48 and second fluid track 42. Solenoid 64 is unenergized in this state, causing the first air cavity 52 and second air cavity 70 to be blocked from communication by virtue of tip 67 of plunger 66 closing off orifice 38. The air volume of only the first air cavity 52 in communication with decoupler 40 increases the compliance of decoupler. The decoupler 40 functions as an air spring supported by the first air cavity 52 to damp relatively low amplitude vibrations. The relative stiffness of the decoupler 40 does not allow fluid to easily pass into the first fluid track 33, forcing the fluid to flow into the second fluid track 42 to damp vibration. When the engine is at idle, the solenoid is actuated, causing tip 67 of plunger 66 to move away from orifice 38 and allowing first and second air cavities 52,70 to communicate. The increased air volume resulting from the communication of air cavities 52,70 with decoupler 40 lowers the compliance of the decoupler, allowing resonance in the first fluid track 33 and generating a reduction in the dynamic response of the mount to better match the disturbance frequencies of the engine at idle.

In an alternate embodiment of the present invention, the first fluid track 33 is configured to provide dynamic response reductions at two different frequency ranges. One example would be to provide a reduction in the dynamic rate of the mount 10 during warm idle and cold idle engine states for improved isolation. A second example is to provide reduction in the dynamic rate of the mount 10 at several structural resonant frequencies. The volume of first air cavity 52 is sized for a dynamic response reduction at a first desired frequency range. When solenoid 64 is unenergized, first air cavity 52 generates a decoupler compliance for resonance of first fluid track 33 at the first desired frequency range. When the solenoid 64 is energized and the first and second air cavities 52,70 are in communication with decoupler 40, the compliance of the decoupler will be reduced due to the increased volume of air in communication with decoupler 40, lowering the resonant point of the first fluid track 33 to a second, lower desired frequency range. The second frequency range is determined by the combined volume of the first and second cavities 52,70. The second fluid track 42 is tuned to provide the desired dynamic rate to provide engine control during operation above idle.

The present invention provides a simple method for assembling a controllable hydraulic mount. A diaphragm 62 is placed onto the orifice plate assembly 32. The diaphragm 62 and orifice plate assembly 32 are then placed inside the base 12. The elastomer body 20 is placed over the base 12, and the elastomer body is then crimped around the base. The mount is filled with hydraulic fluid by any conventional means, such as fill ports, plugs, caps, seals, and the like. The hydraulic fluid (referred to herein generally as "fluid") may be any compatible fluid, such as a mixture of water and ethylene glycol.

The various embodiments have been described in detail with respect to specific embodiments thereof, but it will be apparent that numerous variations and modifications are possible without departing from the spirit and scope of the embodiments as defined by the following claims.

The invention claimed is:

1. A hydraulic mount comprising:
 a) first and second mounting members;
 b) a body connected to one of the mounting members and a base connected to the other of the mounting members;
 c) an orifice plate assembly;
 d) a pumping chamber formed between the body and the orifice plate assembly and a reservoir formed between the orifice plate assembly and a member interposed between the orifice plate assembly and the base, the reservoir being at least partially filled with hydraulic fluid;
 e) a decoupler supported by the orifice plate assembly and in fluid communication with the pumping chamber, wherein the orifice plate assembly includes a first orifice plate including at least one opening therein forming a first fluid track for providing fluid communication between the pumping chamber and the decoupler, a second orifice plate having an orifice, a recess between the orifice plates for receiving the decoupler, the decoupler being secured in the recess in fluid tight sealing engagement with a wall delimiting the recess;
 f) a first air cavity formed between the decoupler and the second orifice plate and operable to damp relatively low amplitude vibrations in a predetermined frequency range;
 g) a second air cavity in communication with the orifice;
 h) a solenoid comprising a spring and a plunger, the solenoid being operable to hold the plunger in communication with the orifice when the solenoid is unenergized and close the orifice to prevent communication between the first and second air cavities, or, when the solenoid is energized, operable to move the plunger away from the orifice so as to permit communication between the first and second air cavities, thereby providing two dynamic response characteristics for the hydraulic mount, dependent upon the volume of air in communication with the decoupler; and
 i) a controller located within the hydraulic mount attached to the second orifice plate and electrically connected to the solenoid.

2. The hydraulic mount of claim 1, further comprising a key connected to the base.

3. The hydraulic mount of claim 1, further comprising an electrical connector attached to the base such that the connector is sealed from the hydraulic fluid within the hydraulic mount and is electrically connected to the controller.

4. The hydraulic mount of claim 1 wherein the controller compensates for variations in temperature.

5. The hydraulic mount of claim 1 wherein the controller compensates for variations in voltage.

6. The hydraulic mount of claim 1 wherein the controller controls an energization rate of the solenoid to reduce the generation of electrical noise by the solenoid.

7. The hydraulic mount of claim 1 wherein the orifice plate assembly is interposed between the body and the base.

8. The hydraulic mount of claim 1, further including a second fluid track formed by the orifice plate assembly for transferring fluid between the pumping chamber and the reservoir.

9. The hydraulic mount of claim 1 wherein the member interposed between the orifice plate assembly and the base comprises a flexible diaphragm delimiting the reservoir.

10. The hydraulic mount of claim 1 wherein the decoupler comprises an elastomeric disk having an outer rim dimensioned to be forcibly engaged with the orifice plate assembly to provide a fluid tight seal to prevent leakage of air from the space between the decoupler and the second orifice plate.

11. The hydraulic mount of claim 10 wherein the decoupler includes an annularly recessed body formed therein and defining part of the first air cavity.

12. The hydraulic mount of claim 1 wherein the volumes of the first and second air cavities are sized to produce a reduction in dynamic rate of the mount at a predetermined first and second range of frequencies, and wherein the first and second ranges of frequencies are selected by energizing or de-energizing the solenoid.

* * * * *